Nov. 3, 1931.  J. M. CROWE  1,830,350
MITER CUTTING MOTOR DRIVEN HAND TOOL
Filed Dec. 21, 1928  2 Sheets-Sheet 1
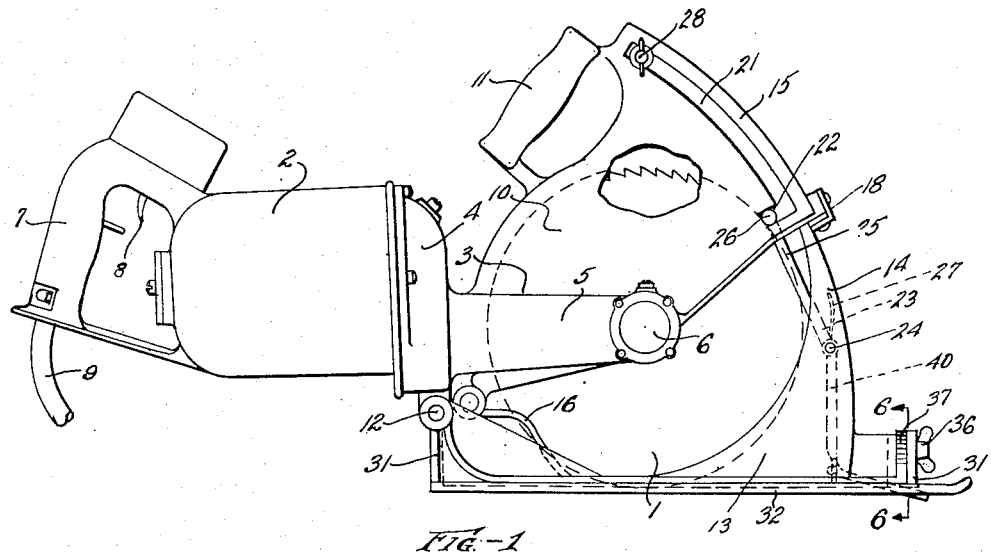
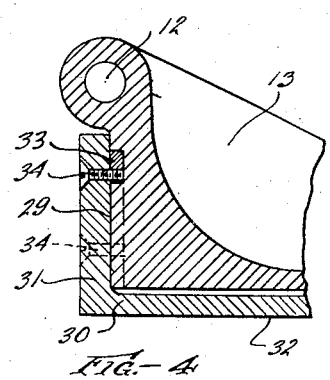
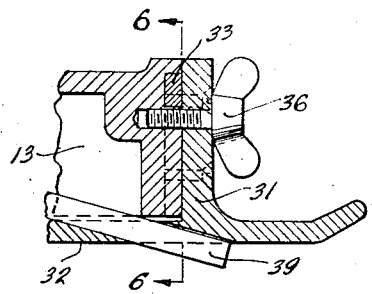
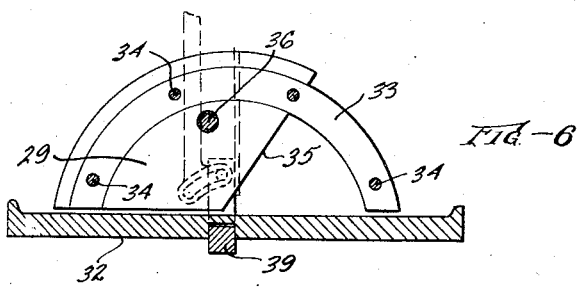
INVENTOR
JOHN M. CROWE
BY
Brockett, Hyde, Higley & Meyer
ATTORNEYS Nov. 3, 1931.    J. M. CROWE    1,830,350
MITER CUTTING MOTOR DRIVEN HAND TOOL
Filed Dec. 21, 1928    2 Sheets-Sheet 2
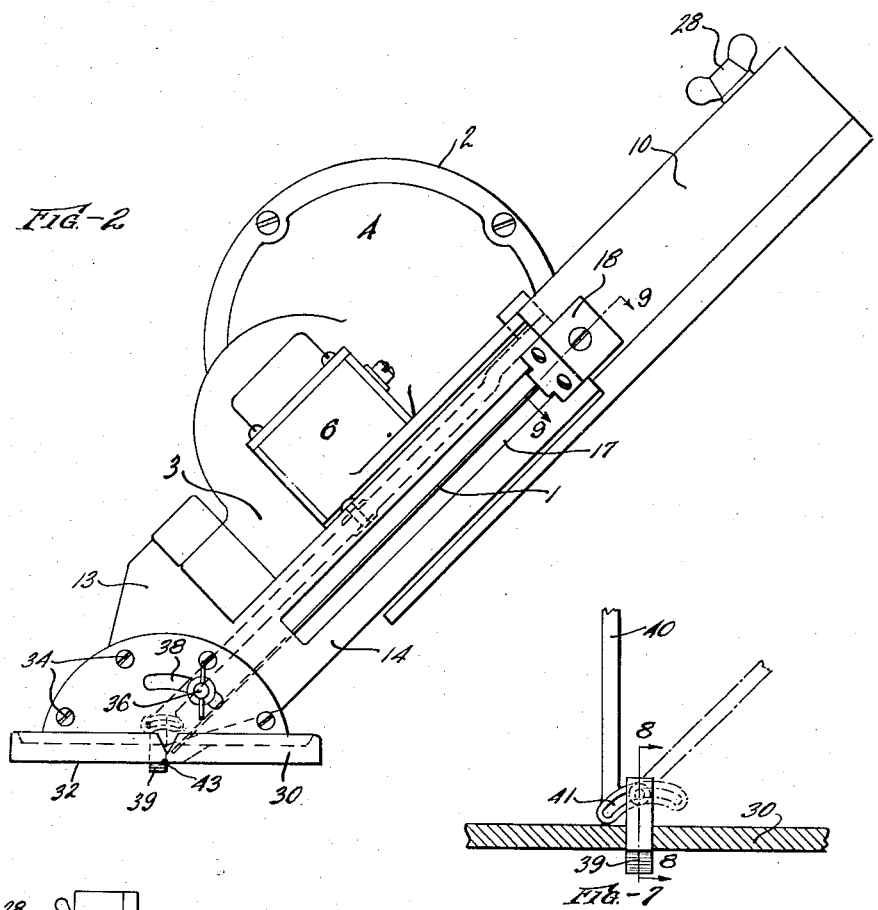
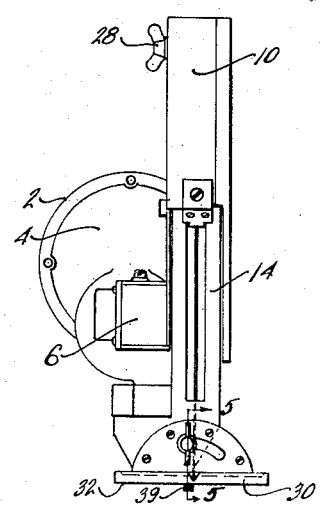
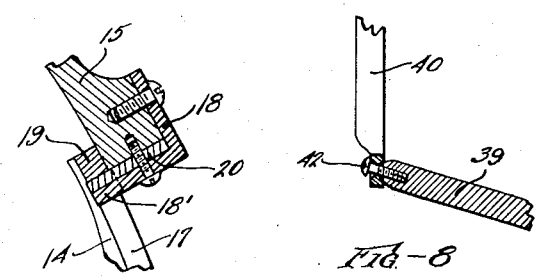
INVENTOR
JOHN M. CROWE
BY
Brockett, Hyde, Higley & Meyer
ATTORNEYS Patented Nov. 3, 1931

1,830,350

UNITED STATES PATENT OFFICE

JOHN M. CROWE, OF COVINGTON, KENTUCKY, ASSIGNOR, BY MESNE ASSIGNMENTS, TO THE STANLEY WORKS, OF NEW BRITAIN, CONNECTICUT, A CORPORATION OF CONNECTICUT

MITER CUTTING MOTOR DRIVEN HAND TOOL

Application filed December 21, 1928. Serial No. 327,542.

This invention relates to portable power driven hand tools adapted to be applied bodily to the work and moved along the same by the operator, such as the so-called "electric hand saws", examples of which are the tools shown in my Patent No. 1,644,326, issued October 4, 1927, and in my co-pending application Serial No. 247,056, filed January 16, 1928, Patent No. 1,780,174.

A tool of the class to which reference is had may comprise a frame, a cutting blade operatively mounted thereon, a motor for operating the blade, guarding means movably mounted on the frame to advance or recede to guard or expose a cutting portion of the blade and comprising a base having a surface adapted to engage and travel along the work, automatic means effective in all tool positions and tending to advance the guarding means, and means also effective in all tool positions for automatically securing the guarding means against retreat.

Broadly speaking, it is an object of my invention to provide in a tool of the character described, means whereby miter cuts may be made.

Such a tool may also have means adapted for actuation by engagement with the work for releasing the guarding means to allow the same to recede, and it is a further object of my invention to make provision for miter cuts in a tool having this additional feature.

Another object of the invention is to make provision for the miter cut by an arrangement of parts whereby the maximum depth of cut is not decreased when a miter cut is to be made.

Still another object of the invention is to provide buffer means for eliminating the destructive shock to the parts when the movable guarding means is stopped in fully advanced position.

The exact nature of my invention together with further objects and advantages thereof will be apparent from the following description taken in connection with the accompanying drawings in which Fig. 1 is a side elevation of a tool in which my invention has been incorporated, showing the parts adjusted to make a normal, that is not a miter cut, and showing the movable guarding means in fully advanced or full guarding position; Figs. 2 and 3 are front end views of the same showing the tool adjusted to make miter and normal cuts respectively, Fig. 3 being drawn to the scale of Fig. 1 and Fig. 2 to a larger scale; Figs. 4 and 5 are detail longitudinal sectional views taken as in the plane of line 5—5, Fig. 3 and showing the rearward and forward portions respectively of the parts whereby the miter adjustment is had; Fig. 6 is a detail view in transverse section as in the plane of line 6—6, Figs. 1 and 5; Fig. 7 is a transverse elevation showing details of the releasing means for the movable guarding means; Fig. 8 is a longitudinal section as in the plane of line 8—8, Fig. 7; and Fig. 9 is a section in the longitudinal plane of line 9—9, Fig. 2, Figs. 4 to 9 inclusive being drawn to a scale enlarged over that of Fig. 2.

With reference now to the drawings the principal parts of the tool shown are a blade 1, which may be a saw blade as indicated by the broken away portion, Fig. 1, a motor 2, and a frame, generally designated by the reference character 3 and to which both the blade and the motor are connected. The motor has suitable driving connection with the blade as by spur reducing gears located in the casing portion 4 of the frame, a shaft within the arm portion 5 thereof, and bevel gears within the hub portion 6 thereof which projects transversely of the blade, as will be well understood by one familiar with the art.

Rearward of the motor 2 is a handle 7, having incorporated therewith a switch for controlling the motor and actuable by the trigger 8, power being supplied the motor subject to actuation of the switch as by cable 9 entering the handle.

The frame includes a fixed guard portion 10 inclosing the upper portion of the blade and which may be integral as indicated and carry a handle 11 whereby the tool may be conveniently manipulated by means of the handles 7 and 11. Pivotally connected with the frame as at 12 is a movable guard member 13 having an upwardly extending portion 14 curved about the center 12 and adapted to telescope within the corresponding portion 15 of the portion 10 of the frame.

The bottom portion of the movable guard 13 is open for clearance of the blade as the movable guard recedes within the fixed guard, and the movable guard is yieldably urged against such recessional movement by a spring 16. The advance of the movable guard is limited to the position indicated, Fig. 1, by cooperating parts associated with the portions 14 and 15 of the two guarding means described. For this purpose the portion 14 of the movable guard is slotted as at 17, and a bracket member 18 is secured with the fixed guard. The bracket member 18 has a tongue 18' extending within the slot 17 of the movable guard, and adapted to abut the end bridge portion 19 of the movable guard in fully advanced position of the latter. A buffer member 20, which may be of rawhide or other like yielding substance, is arranged as shown, Fig. 9, as a facing for the tongue 18' and is therefore interposed between the tongue and the bridge 19 to stop the movable guard in fully advanced position without damaging shock to the parts.

The fixed guard 10 is provided with a lateral slot 21 arcuate about the axis 12 and terminating in an off-set notch 22. The movable guard 13 carries a latch lever 23 pivotally mounted as at 24 and having an arm 25 carrying at its end a roller 26 adapted to run in the slot 21. The latch lever is yieldably urged in counter-clockwise direction, Fig. 1, as by a spring 27 whereby when the movable guard is moved to fully advanced position, the roller 26 is caused to enter the notch 22 and latch the movable guard against accidental recession.

A stop bolt 28 is adjustable in the slot 21 to be engaged in various positions by the roller 26 and thus limit the amount of recession of the movable guard 13, to serve as a depth gauge as will later appear.

The ends of the movable guard 13 are faced off transversely of the tool as at 29. A runner 30 is provided having upstanding end members 31 and a flat work engaging surface 32, longitudinally slotted in the plane of the blade to clear the same. The end members 31 are faced off inside to fit the faces 29 of the movable guard 13. The runner 32 is mounted for movement with the movable guard 13 and for adjustment thereon about an axis longitudinal of the cut as by means of segmental ring members 33 secured each to one of the parts and shown as secured to the upstanding members 31 of the runner by means of screws 34. These ring members fit within grooves in the faces of the members opposed to those carrying the ring members; and the parts are so proportioned and arranged that the ring members and grooves are arcuate about an axis defined by the intersections of the planes of the blade and of the work engaging surface 32 of the runner.

The movable guard member 13 is longitudinally faced off as at 35 whereby the assembly which includes the blade, the frame and the movable guard 13 may be tilted with reference to the runner about a longitudinal axis as from the vertical position, Fig. 3, wherein normal cuts may be made, to one direction as indicated, Fig. 2, in which miter cuts may be made. The adjusted relation of the runner and movable guard may be maintained as by means of the clamp screw 36 turning into the movable guard 13 through a slot 38 in the forward runner member 31, and suitable graduations 37 are conveniently arranged upon one of the parts with an index on the opposite part whereby the desired angle of this adjustment may be established.

It will be noted that the tilt of the parts from normal cutting position to miter cutting position is such that if a miter cut is to be made the remaining parts of the tool are moved upon the runner in a direction in which the motor moves in the direction of the blade. The motor being the heaviest single part of the tool the center of gravity of the tool lies within the confines of the motor or approximately so, and by the arrangement described, therefore, the center of gravity of the tool throughout its range of miter adjustment will always lie, if the work is horizontal, as nearly as possible over the work engaging face 32.

Also, bearing in mind that the maximum depth of cut is limited by engagement of the hub 6 with the movable guard and runner parts, by arranging the swing of the miter adjustment whereby the hub moves away from the runner, this maximum cut is not decreased when a miter adjustment is made.

For the purpose of arranging for unlatching the movable guard by engagement of the tool with the work, the runner 30 is provided with an opening in the longitudinal plane, to receive a tongue 39, of square section, the fit of the tongue in the opening being such that the tongue may slide in the opening, but will be caused to move with the runner as miter adjustments are made. The latch lever 23 has an arm 40 downwardly extending from the pivot 24 and having connection with the inner extremity of the tongue 39 as indicated particularly, Figs. 6, 7, and 8. This connection includes slot 41 at the extremity of the lever arm 40 engaged by a headed member 42 secured with the adjacent end of the tongue 39. The slot 41 is arcuate about the same axis as that about which the runner and movable guard are relatively adjustable; and there is sufficient lost motion in the longitudinal plane in the connection, that the tongue 39 may be moved rearward of the tool (to the left, Figs. 1, 5 and 8) to move the latch lever 23 in clockwise direction, Fig. 1 and thus unlatch the movable guard. And this unlatching, by virtue of the slot 41, may be effected independent of the miter adjustment.

Operation of the tool will be apparent. The tool is brought to engagement with the work by means of the handles described, and since the movable guard is normally latched in fully advanced and full guarding position the blade can only be operative for making a cut as the guard is unlatched. This is effected by engagement of the tongue 39 with the work, upon which the movable guard is unlatched and the face 32 of the runner remaining in engagement with the work, the blade may be moved downward into the work by tilting the frame and parts secured therewith in a clockwise direction, Fig. 1, about the axis 12. The depth of cut is limited by adjustment of the stop bolt 28.

Where a miter cut is to be made the runner is first adjusted on the movable guard to the desired angle, after which the operation is as described. It will be noted that the slot 43 provided in the runner for clearance of the blade need only be very narrow since the clearance relation of the blade with this slot is independent of the miter adjustment.

What I claim is:

1. In a portable hand tool, a frame, a cutting blade operatively mounted thereon, a motor for operating said blade, guarding means movably mounted on said frame to advance or recede to guard or expose a cutting portion of said blade, and a runner having a surface adapted to engage and travel along the work and mounted for movement with said guarding means and for adjustment relative thereto about an axis longitudinal of the cut.

2. In a portable hand tool, a frame, a cutting blade operatively mounted thereon, a motor for operating said blade, guarding means movably mounted on said frame to advance or recede to guard or expose a cutting portion of said blade, and a runner having a surface adapted to engage and travel along the work and mounted upon said guarding means for adjustment relative thereto about an axis in the plane of said surface and longitudinal of the cut.

3. In a portable hand tool, a frame, a cutting blade operatively mounted thereon, a motor for operating said blade, guarding means movably mounted on said frame to advance or recede to guard or expose a cutting portion of said blade and having a guarding portion extending a substantial distance adjacent said blade, and a runner having a surface adapted to engage and travel along the work and mounted for movement with said guarding means and for adjustment relative thereto about an axis in the planes of said surface and of said blade.

4. In a portable hand tool, a frame, a cutting blade operatively mounted thereon, a motor for operating said blade, guarding means movably mounted on said frame to advance or recede to guard or expose a cutting portion of said blade and having a guarding portion extending a substantial distance adjacent said blade, and a runner having a surface adapted to engage and travel along the work and having opposite end connections with said guarding means for movement therewith and for adjustment thereon about an axis longitudinal of the cut, said connections including aligned segmental ring portions cooperating with arcuate grooves on the respective parts.

5. In a portable hand tool, a frame, a cutting blade operatively mounted thereon, a motor for operating said blade, guarding means movably mounted on said frame to advance or recede to guard or expose a cutting portion of said blade and having a guarding portion extending a substantial distance adjacent said blade, and a runner having a surface adapted to engage and travel along the work and having connection with said guarding means at opposite ends, for movement therewith and for adjustment thereon about an axis longitudinal of the cut, said connection including aligned segmental ring portions cooperating with arcuate grooves on the respective parts, said ring and groove portions being concentric about an axis defined by the planes of said surface and of said blade.

6. In a portable hand tool, a frame, a cutting blade operatively mounted thereon, a motor for operating said blade, guarding means pivotally mounted on said frame rearwardly of said blade to advance or recede to guard or expose a cutting portion of said blade, a runner having a surface adapted to engage and travel along the work and mounted for movement with said guarding means, and for adjustment about an axis longitudinal of the cut, and means at the forward end of said tool for securing said runner with said guarding means in adjusted position.

7. In a portable hand tool, a frame, a cutting blade operatively mounted thereon, means for operating said blade, guarding means adapted to advance or recede to guard or expose a cutting portion of said blade, means tending to advance said guarding means, means for securing said guarding means against accidental recession, a runner mounted for movement with said guarding means and for adjustment about an axis longitudinal of the cut and having a surface adapted to engage and travel along the work, and means associated with said runner for actuation by engagement with the work, for releasing said guarding means to allow the same to recede.

8. In a portable hand tool, a frame, a cutting blade operatively mounted thereon, means for operating said blade, guarding means adapted to advance or recede to guard or expose a cutting portion of said blade and having a guarding portion extending a substantial distance adjacent said blade, means tending to advance said guarding means, means for securing said guarding means against accidental recession, a runner mounted for movement with said guarding means and for adjustment relative thereto about an axis longitudinal of the cut and having a surface adapted to engage and travel along the work, and means for releasing said guarding means to allow the same to recede, said releasing means including a member associated with said guard and movable therewith and a member associated with said runner for actuation by engagement with the work, said members having operative connection arranged to be unaffected by said runner adjustment.

9. In a portable hand tool, a frame, a cutting blade operatively mounted thereon, a motor secured with said frame, driving connection between said motor and said blade and having a hub portion projecting laterally of the blade, guarding means movably mounted on said frame to advance or recede in the plane of said blade to guard or expose a cutting portion thereof, and a runner adapted to engage and travel along the work the runner being mounted for movement with said guarding means, whereby the blade projection therebeyond, and hence the depth of cut is limited by engagement of said hub with the adjacent portion of said runner, the runner being mounted for adjustment from a position normal to the plane of said blade, about an axis longitudinal of the cut, in a direction to move said runner portion adjacent said hub therefrom, whereby the blade may be caused to make normal or minor cuts of maximum depth.

10. A portable power driven saw comprising, in combination with a driven shaft having a saw blade mounted thereon, a rigid frame structure comprising a fixed arcuate guard member overlying the upper portion of the saw blade and providing a mounting for said shaft, a single guide rest in the form of an elongated plate of a length greater than the diameter of the saw blade and having a central longitudinal slot through which the lower portion of the blade may project, and means for adjustably securing the opposite ends of said rest directly to the frame structure at opposite ends of said guard member, said means comprising two upstanding lugs on the rest, one near each end thereof, and independent link members respectively connecting said lugs to the frame structure, the connection between the link members and the lugs being adapted to permit of an angular tilting adjustment of the rest relative to the guard member on an axis extending longitudinally of the rest, and the connection between the link members and the frame structure being adapted to permit of the movement of the rest toward and from the rotation axis of the saw whereby to vary the depth of the cut.

11. In combination in an electric handsaw, a saw frame, a motor with a circular saw geared thereto carried by the frame, a bracket pivoted to the saw frame on an axis parallel to the axis of rotation of the saw at one end of such frame, a second bracket carried by the saw frame at its other end and adjustable transversely of the line of feed of the saw frame and transversely of the axis of rotation of the saw, a base plate pivoted to said brackets in the plane of rotation of the saw on an axis at right angles to the axis of rotation of the saw and formed to permit the movement of the saw therethrough in its adjustments for depth of cut and angle of cut, and means for holding the said second bracket and said base plate in their various positions of adjustment.

In testimony whereof I hereby affix my signature.

JOHN M. CROWE.